United States Patent
Kim et al.

(10) Patent No.: US 10,304,493 B2
(45) Date of Patent: May 28, 2019

(54) CARTOON CONTENT EDITING METHOD AND CARTOON CONTENT EDITING APPARATUS

(71) Applicant: NAVER CORPORATION, Seongnam-si (KR)

(72) Inventors: Hyo Kim, Seongnam-si (KR); Hyun Chul Lee, Seongnam-si (KR); Ji Han Kim, Seongnam-si (KR); Dai Hyun Lim, Seongnam-si (KR); Byoung Kwan Kim, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 0 days.

(21) Appl. No.: 15/056,959

(22) Filed: Feb. 29, 2016

(65) Prior Publication Data
US 2016/0275988 A1    Sep. 22, 2016

(30) Foreign Application Priority Data
Mar. 19, 2015   (KR) .................. 10-2015-0038240

(51) Int. Cl.
 *G11B 27/034*    (2006.01)
 *G11B 27/34*    (2006.01)

(52) U.S. Cl.
 CPC ............ *G11B 27/034* (2013.01); *G11B 27/34* (2013.01)

(58) Field of Classification Search
 CPC ....... G11B 27/034; G11B 27/34; G11B 27/28; G06K 9/00711; G06K 9/00765; G06F 17/30843; G06F 17/30017; H04N 1/212; H04N 1/0044; H04N 1/00442; H04N 1/00456; H04N 2201/0067

USPC ......................................................... 386/282
 See application file for complete search history.

(56) References Cited

U.S. PATENT DOCUMENTS

| | | | | |
|---|---|---|---|---|
| 5,459,830 | A * | 10/1995 | Ohba ................... | G11B 27/031 345/473 |
| 5,974,218 | A * | 10/1999 | Nagasaka ......... | G06F 17/30843 386/200 |
| 6,252,975 | B1 * | 6/2001 | Bozdagi ............ | G06F 17/30811 382/107 |
| 6,307,550 | B1 * | 10/2001 | Chen ................. | G06F 17/30811 345/418 |

(Continued)

FOREIGN PATENT DOCUMENTS

| CN | 1327220 | 12/2001 |
|---|---|---|
| CN | 101123607 | 2/2008 |

(Continued)

OTHER PUBLICATIONS

Miyake, Machine genterated translation of JP 2002-049925A, Feb. 2002.*

(Continued)

*Primary Examiner* — David E Harvey
(74) *Attorney, Agent, or Firm* — Greer Burns & Crain, Ltd.

(57) ABSTRACT

Provided is a cartoon content editing method including: displaying, by a controller, at least one of a plurality of cuts included in cartoon content on a display unit; receiving, by an input receiver, a command to generate a still cut, which is a still image, from a motion cut including movement from among the cuts; and generating, by the controller, the still cut by inserting at least one of a plurality of scenes shown during the movement of the motion cut.

17 Claims, 6 Drawing Sheets

(56) References Cited

U.S. PATENT DOCUMENTS

| | | | | |
|---|---|---|---|---|
| 6,340,971 B1* | 1/2002 | Janse | G11B 27/107 | 348/E5.097 |
| 6,408,301 B1* | 6/2002 | Patton | G06F 17/30265 | 707/741 |
| 6,535,639 B1* | 3/2003 | Uchihachi | G06F 17/30799 | 341/79 |
| 6,571,054 B1* | 5/2003 | Tonomura | G06F 3/0483 | 386/241 |
| 6,697,523 B1* | 2/2004 | Divakaran | G06F 17/30802 | 382/173 |
| 6,807,361 B1* | 10/2004 | Girgensohn | G11B 27/034 | 386/227 |
| 7,203,380 B2* | 4/2007 | Chiu | H04N 5/262 | 348/E5.051 |
| 7,275,210 B2* | 9/2007 | Girgensohn | G06F 17/30843 | 715/246 |
| 7,383,508 B2* | 6/2008 | Toyama | G06F 3/0481 | 348/E5.067 |
| 7,555,718 B2* | 6/2009 | Girgensohn | G06F 17/30802 | 707/999.003 |
| 8,028,314 B1* | 9/2011 | Sezan | G06F 17/30828 | 709/223 |
| 8,149,286 B2* | 4/2012 | Takagi | G11B 27/034 | 348/222.1 |
| 8,416,332 B2* | 4/2013 | Sato | G06T 11/60 | 348/333.05 |
| 8,447,165 B1* | 5/2013 | Hughes | G06F 17/30843 | 386/241 |
| 8,699,806 B2* | 4/2014 | Yagnik | G06F 17/30787 | 382/236 |
| 8,891,109 B2* | 11/2014 | Hasegawa | H04N 1/0044 | 347/251 |
| 9,064,538 B2* | 6/2015 | Gupta | G11B 27/034 | |
| 9,116,924 B2* | 8/2015 | Marchesotti | G06F 17/30274 | |
| 2002/0015050 A1* | 2/2002 | Kawai | G06T 11/00 | 345/635 |
| 2002/0036632 A1* | 3/2002 | Kuriyama | H04N 1/0035 | 345/204 |
| 2002/0175917 A1* | 11/2002 | Chakravarty | G11B 27/034 | 345/473 |
| 2003/0007555 A1* | 1/2003 | Divakaran | G06F 17/30802 | 375/240.01 |
| 2003/0016864 A1* | 1/2003 | McGee | G06T 7/00 | 382/165 |
| 2003/0068100 A1* | 4/2003 | Covell | G06F 17/30256 | 382/305 |
| 2003/0177503 A1* | 9/2003 | Sull | G06F 17/30796 | 725/112 |
| 2003/0202110 A1* | 10/2003 | Owens | H04N 1/00283 | 348/222.1 |
| 2004/0001696 A1* | 1/2004 | Kogusuri | G11B 27/105 | 386/230 |
| 2004/0024780 A1* | 2/2004 | Agnihotri | G11B 27/28 | |
| 2005/0025249 A1* | 2/2005 | Zhao | H04N 19/124 | 375/240.24 |
| 2005/0254782 A1* | 11/2005 | Hsu | G11B 27/031 | 386/283 |
| 2006/0050321 A1* | 3/2006 | Takahashi | H04N 1/2112 | 358/296 |
| 2006/0114992 A1* | 6/2006 | Shibata | G06F 17/30787 | 375/240.08 |
| 2006/0192791 A1* | 8/2006 | Schick | H04N 1/00132 | 345/661 |
| 2009/0021592 A1* | 1/2009 | Oyama | H04N 5/23293 | 348/220.1 |
| 2009/0080020 A1* | 3/2009 | Kitagawa | H04N 5/85 | 358/1.15 |
| 2009/0083781 A1* | 3/2009 | Yang | G06F 17/30781 | 725/20 |
| 2009/0102807 A1* | 4/2009 | Kashiwa | G06F 15/025 | 345/173 |
| 2009/0136200 A1* | 5/2009 | Tokunaka | G11B 27/034 | 386/241 |
| 2009/0245643 A1* | 10/2009 | Hasegawa | H04N 1/0035 | 382/181 |
| 2010/0077289 A1* | 3/2010 | Das | G06F 17/30265 | 715/230 |
| 2010/0199227 A1* | 8/2010 | Xiao | G06F 3/0481 | 715/863 |
| 2010/0209071 A1 | 8/2010 | Cho | | |
| 2012/0020648 A1* | 1/2012 | Yamaji | G11B 27/034 | 386/278 |
| 2012/0057845 A1* | 3/2012 | Obana | G06F 17/30244 | 386/241 |
| 2012/0082431 A1* | 4/2012 | Sengupta | H04N 5/772 | 386/241 |
| 2012/0117473 A1* | 5/2012 | Han | G11B 27/034 | 715/723 |
| 2012/0148149 A1* | 6/2012 | Kumar | G06K 9/00711 | 382/162 |
| 2012/0219271 A1* | 8/2012 | Vunic | G06K 9/00711 | 386/278 |
| 2012/0257876 A1* | 10/2012 | Gupta | G11B 27/034 | 386/285 |
| 2013/0031479 A1* | 1/2013 | Flowers | G06F 8/00 | 715/716 |
| 2013/0086458 A1* | 4/2013 | Kurata | G06T 11/60 | 715/202 |
| 2013/0124996 A1* | 5/2013 | Margulis | G06F 3/0484 | 715/719 |
| 2013/0251274 A1* | 9/2013 | Xie | G06K 9/6202 | 382/218 |
| 2014/0133834 A1* | 5/2014 | Shannon | H04N 9/80 | 386/278 |
| 2015/0269160 A1* | 9/2015 | Babaian | G06F 17/30038 | 707/751 |
| 2015/0382083 A1* | 12/2015 | Chen | G06F 17/30843 | 386/281 |
| 2016/0093332 A1* | 3/2016 | Rao | G11B 27/034 | 348/207.1 |
| 2016/0140997 A1* | 5/2016 | Sinha | G11B 27/031 | 386/241 |
| 2016/0205340 A1* | 7/2016 | Jang | H04N 5/919 | 348/14.02 |

FOREIGN PATENT DOCUMENTS

| | | | |
|---|---|---|---|
| CN | 102184200 | | 9/2011 |
| CN | 103810740 | | 5/2014 |
| CN | 104835187 | | 8/2015 |
| JP | 2002-49925 A | * | 2/2002 |
| JP | 2002-049925 A | | 2/2002 |
| JP | 2003085572 | | 3/2003 |
| JP | 2005027021 | | 1/2005 |
| JP | 2007049654 | | 2/2007 |
| JP | 2008-294938 | * | 12/2008 |
| JP | 2009-098504 | | 5/2009 |
| JP | 2009-98504 A | * | 5/2009 |
| JP | 2013077982 A | | 4/2013 |
| KR | 10-2009-0015323 | | 2/2009 |
| KR | 1020110096957 A | | 8/2011 |
| KR | 10-2015-0010898 A | | 1/2015 |
| WO | WO 03/041016 | * | 5/2003 |

OTHER PUBLICATIONS

Office Action issued in corresponding Korean patent application No. 10-2015-0038240, dated Dec. 16, 2015.

Notice of allowance issued in corresponding Korean patent application No. 10-2015-0038240, dated Jun. 28, 2016.

Office Action issued by the Japanese Patent Office for corresponding JP Application No. 2016-030112, dated Feb. 21, 2017.

Office Action issued by the Taiwanese Patent Office for corresponding TW Application No. 105108237, dated Nov. 8, 2016.

(56) References Cited

OTHER PUBLICATIONS

Office Action issued by the Korean Patent Office for corresponding KR Patent Application No. 10-2016-0103194, dated Nov. 8, 2016.

* cited by examiner

CARTOON CONTENT EDITING METHOD AND CARTOON CONTENT EDITING APPARATUS

CROSS-REFERENCE TO RELATED APPLICATION

This application claims the benefit of Korean Patent Application No. 10-2015-0038240, filed on Mar. 19, 2015, in the Korean Intellectual Property Office, the disclosure of which is incorporated herein in its entirety by reference.

BACKGROUND

1. Field

One or more exemplary embodiments relate to a cartoon content editing method and a cartoon content editing apparatus.

2. Description of the Related Art

A cartoon is a picture, or group of pictures, intended to satirize or criticize life or society by exaggerating or omitting the features of an object and using humor, caricature, social commentary, etc. Cartoons may be classified into one or more various genres, e.g., romance cartoons, martial arts cartoons, action cartoons, comic cartoons, sports cartoons, science fiction (SF) cartoons, etc., according to the contents thereof. A cartoon may visually portray complex details using a visual system of images and text and is thus more effective in attracting the attention of readers than a general book containing only alphabetical characters.

Recently, cartoon content is being transferred through a communication medium, such as the Internet, departing from the traditional medium of comic books, and cartoon services enabling users to read cartoons by using an electronic device are provided. As the cartoon services are provided through electronic devices, cartoons having functions that were unable to be realized by traditional comic books, for example, a function of providing sound with a cartoon or a function of providing movement in a cartoon, have appeared.

Information disclosed in this Background section may include information that was already known to the inventors before achieving the inventive concept and/or technical information acquired in the process of achieving the inventive concept. Therefore, it may contain information that should not be considered as prior art that is already known to the public in this country.

SUMMARY

One or more exemplary embodiments of the present invention include a cartoon content editing method and a cartoon content editing apparatus in which a cartoon including movement is edited to generate a cartoon only including a still image.

One or more exemplary embodiments include a cartoon content editing method and a cartoon content editing apparatus in which cartoon content including motion cuts including movement is edited to generate cartoon content including only still cuts that are still images.

Additional aspects will be set forth in part in the description which follows and, in part, will be apparent from the description, or may be learned by practice of the presented embodiments.

According to one or more exemplary embodiments, a cartoon content editing method includes: displaying, by a controller, at least one of the cuts included in cartoon content on a display unit; receiving, by an input receiver, a command to generate a still cut, which is a still image, from a motion cut including movement from among the cuts; and generating, by the controller, the still cut by inserting at least one of the scenes shown during the movement of the motion cut.

According to one or more exemplary embodiments, a cartoon content editing apparatus includes: an input receiver configured to receive a command to generate a still cut, which is a still image, from a motion cut including movement from among the cuts included in cartoon content; and a controller configured to control a display unit to display a process of editing the cartoon content, and to generate the still cut by inserting at least one of the scenes shown during the movement of the motion cut.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments of the present invention, examples of which are illustrated in the accompanying drawings. In this regard, the present embodiments may have different forms and should not be construed as being limited to the descriptions set forth herein. Accordingly, the exemplary embodiments are merely described below, by referring to the figures, to explain aspects of the present description. It will be understood that although the terms "first", "second", etc. may be used herein to describe various components, these components should not be limited by these terms. These terms are only used to distinguish one component from another. As used herein, the singular forms "a," "an" and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components. Sizes of elements in the drawings may be exaggerated for convenience of explanation. In other words, since sizes and thicknesses of components in the drawings are arbitrarily illustrated for convenience of explanation, the following embodiments are not limited thereto. As used herein, the term "and/or" includes any and all combinations of one or more of the associated listed items. Expressions such as "at least one of," when preceding a list of elements, modify the entire list of elements and do not modify the individual elements of the list.

Hereinafter, one or more exemplary embodiments will be described in detail with reference to accompanying drawings. In the drawings, like reference numerals refer to like elements throughout, and overlapping descriptions will not be repeated.

Figure 1:
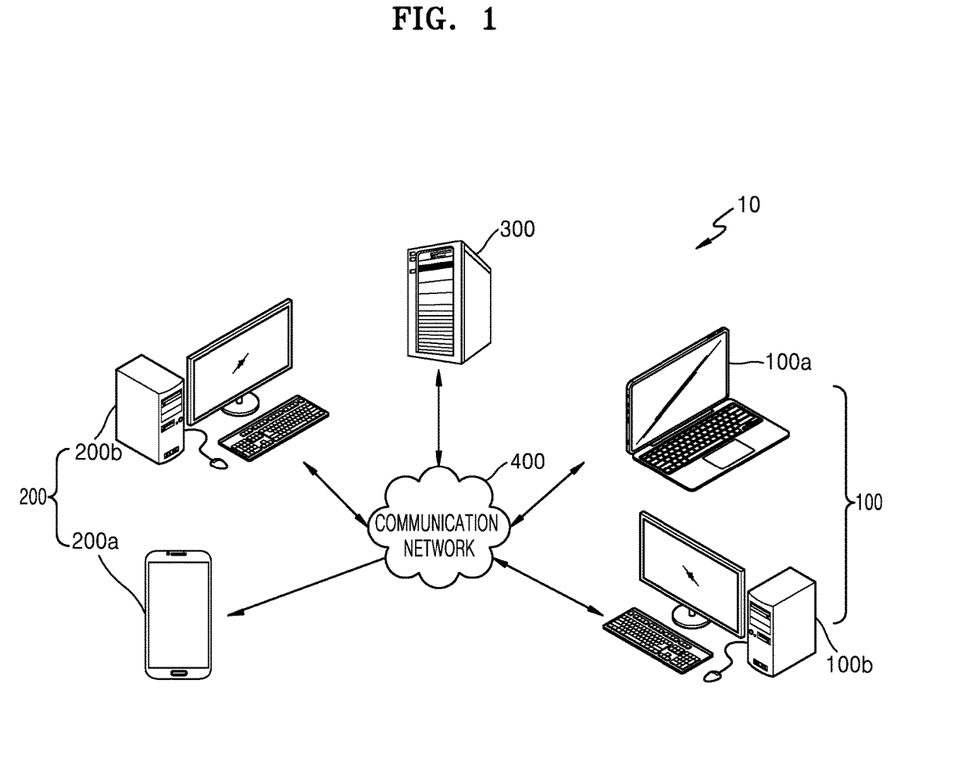
FIG. 1 is a diagram schematically illustrating a configuration of a cartoon content providing system, according to an exemplary embodiment.

FIG. 1 is a diagram schematically illustrating a configuration of a cartoon content providing system 10, according to an exemplary embodiment.

Referring to FIG. 1, the cartoon content providing system 10 according to an exemplary embodiment may include a cartoon content editing apparatus 100. Also, the cartoon content providing system 10 may include a cartoon content displaying apparatus 200. Also, the cartoon content providing system 10 may include a cartoon content storing apparatus 300. Also, the cartoon content providing system 10 may include a communication network 400 that mutually connects the cartoon content editing apparatus 100, the cartoon content displaying apparatus 200, and the cartoon content storing apparatus 300.

Herein, cartoon content may be image data that is visually recognized due to it including a character (such as an alphabetical character), a drawing, or a picture, and that includes an object capable of transmitting visual information to another party or a group of objects. The cartoon content may be manufactured by a cartoonist. The cartoon content may include at least one cut. Here, a cut may be a visual object or a group of a plurality of visual objects classified in a certain unit, and may include a plurality of layers including a character, a drawing, or a picture. In other words, a layer may include a character, a drawing, a picture, or a combination thereof, a cut may be a combination of at least one layer located within a certain region, and cartoon data may be a combination of a plurality of cuts provided at one time.

Types of a cut may include a motion cut and a still cut. A motion cut may be a cut in which at least one of the layers includes movement. Here, movement may be a change of a form of a visual symbol according to time. Here, a visual symbol may denote a visually recognizable object, such as a character, a drawing, or a picture, or a group of such visually recognizable objects. Movement may be a change of a drawing or a picture according to time, or a change of a character according to time. A still cut may be a cut only including layers having forms that do not change according to time. An example of a form of a motion cut will be described below with reference to FIG. 4.

The cartoon content editing apparatus 100 may be an apparatus used to edit cartoon content. The cartoon content editing apparatus 100 may be an apparatus used to generate cartoon content including only still cuts by editing cartoon content including at least one motion cut. A plurality of the cartoon content editing apparatuses 100 may be connected to the communication network 400. The cartoon content editing apparatus 100 may be a communication terminal capable of transmitting and receiving data to and from another apparatus in a wired/wireless communication environment. The cartoon content editing apparatus 100 may be any apparatus capable of editing cartoon content stored in an internal or external memory, and capable of storing the edited cartoon content again in the internal or external memory. In FIG. 1, the cartoon content editing apparatus 100 is shown as a laptop, but exemplary embodiments are not limited thereto. For example, the cartoon content editing apparatus 100 may be a smart phone, a personal computer (PC), a tablet PC, a smart television (TV), a mobile phone, a personal digital assistant (PDA), a laptop, a media player, a micro-server, a global positioning system (GPS) device, an electronic book terminal, a digital broadcasting terminal, a navigation device, a kiosk, an MP3 player, a digital camera, a wearable device, or another mobile or non-mobile computing device that includes a computer processor, but an exemplary embodiment is not limited thereto. Also, the cartoon content editing apparatus 100 may include any one of various apparatuses for receiving a touch input, such as an electronic bulletin board or a touch table. Also, the cartoon content editing apparatus 100 may be an accessory, such as a watch, glasses, a hair band, or a ring, which has a communication function or a data processing function, but an exemplary embodiment is not limited thereto.

The cartoon content editing apparatus 100 may be an apparatus provided with a cartoon editing tool enabling or facilitating cartoon content to be edited. The cartoon content editing apparatus 100 may be an apparatus capable of transmitting or receiving data to and from another apparatus in a wired/wireless communication environment. The cartoon content editing apparatus 100 may be an apparatus providing cartoon content to the cartoon content storing apparatus 300.

The cartoon content editing apparatus 100 may include an apparatus used by a cartoonist to provide cartoon content to the cartoon content displaying apparatus 200 or the cartoon content storing apparatus 300, i.e., it may include a cartoon content providing apparatus. Alternatively, the cartoon content editing apparatus 100 may be a component included in the cartoon content providing apparatus. The cartoon content editing apparatus 100 may include an apparatus used to by a cartoonist to personally manufacture cartoon content, i.e., may include a cartoon content manufacturing apparatus. Alternatively, the cartoon content editing apparatus may be a component included in the cartoon content manufacturing apparatus. Here, a cartoon editing tool may be a function included in a cartoon manufacturing tool.

The cartoon content displaying apparatus 200 may be an apparatus for displaying cartoon content. A plurality of the cartoon content displaying apparatuses 200 may be connected to the communication network 400. The cartoon content displaying apparatus 200 may be a communication terminal capable of transmitting and receiving data to and from another apparatus in a wired/wireless communication environment. The cartoon content displaying apparatus 200 may be any one of various apparatuses capable of displaying, on a display unit of the cartoon data displaying apparatus 200, cartoon data stored in an internal or external memory. In FIG. 1, the cartoon content displaying apparatus 200 includes a first cartoon content displaying apparatus 200a in a form of a smart phone and a second cartoon content displaying apparatus 200b in a form of a desktop computer, but an exemplary embodiment is not limited thereto. For example, the cartoon content displaying apparatus 200 may be a smart phone, a PC, a tablet PC, a smart TV, a mobile phone, a PDA, a laptop, a media player, a micro-server, a GPS device, an electronic book terminal, a digital broadcasting terminal, a navigation device, a kiosk, an MP3 player, a digital camera, a wearable device, or another mobile or non-mobile computing device, but an exemplary embodiment is not limited thereto. Also, the cartoon content displaying apparatus 200 may include any one of various apparatuses for receiving a touch input, such as an electronic bulletin board or a touch table. Also, the cartoon content displaying apparatus 200 may be an accessory, such as a watch, glasses, a hair band, or a ring, which has a communication function or a data processing function, but an exemplary embodiment is not limited thereto.

The cartoon content displaying apparatus 200 may further include a display unit. The display unit may display cartoon content and move the cartoon content according to an input of a user regarding the cartoon content. For example, the cartoon content may be image data having a size that is difficult to be displayed all at once on the display unit. Thus, the display unit may initially display only a region of the cartoon content, and then display another region of the cartoon content when the user scrolls through the cartoon content. An operation of scrolling through cartoon content may be an operation of changing a state of the display unit of the cartoon content displaying apparatus 200 from displaying a first region of the cartoon content to displaying a second region different from the first region. While scrolling through the cartoon content, cuts included in the first or second region or cuts disposed between the first and second regions may be displayed on the display unit of the cartoon content displaying apparatus 200 for at least a certain period of time.

The display unit of the cartoon content displaying apparatus 200 may include at least one of a liquid crystal display (LCD), a thin-film transistor-liquid crystal display (TFT-LCD), an organic light-emitting diode (OLED), a flexible display, a 3-dimensional (3D) display, and an electrophoretic display, but exemplary embodiments are not limited thereto. According to an exemplary embodiment, the cartoon content displaying apparatuses 200 may include at least two of the display units.

The cartoon content storing apparatus 300 may be an apparatus for storing cartoon content provided by the cartoon content editing apparatus 100. The cartoon content storing apparatus 300 may be a server storing cartoon content. The cartoon content storing apparatus 300 may receive and store cartoon content from the cartoon content manufacturing apparatus, or may store cartoon content to be provided to the cartoon content displaying apparatus 200. The cartoon content storing apparatus 300 may provide cartoon content stored therein to the cartoon content displaying apparatus 200. Also, the cartoon content storing apparatus 300 may provide cartoon content according to a cartoon content supply request of the cartoon content editing apparatus 100. In FIG. 1, the cartoon content storing apparatus 300 is one physical apparatus, but a plurality of cartoon content storing apparatuses 300 may exist according to traffic or data amount.

The cartoon content storing apparatus 300 may store cartoon content according to the type of cartoon. For example, the cartoon content storing apparatus 300 may distinguishably store cartoon content including motion cuts and cartoon content including only still cuts with respect to cartoon content of the same episode of the same series. The cartoon content storing apparatus 300 may provide different types of cartoon content based on a type of the cartoon content displaying apparatus 200 that requested for cartoon content. For example, when the cartoon content displaying apparatus 200 is an apparatus capable of displaying movement of cartoon content, the cartoon content storing apparatus 300 may transmit cartoon content including motion cuts to the cartoon content displaying apparatus 200. As another example, when the cartoon content displaying apparatus 200 is an apparatus incapable of displaying movement of cartoon content, the cartoon content storing apparatus 300 may transmit cartoon content including only still cuts to the cartoon content displaying apparatus 200.

Also, the cartoon content storing apparatus 300 may provide different types of cartoon content according to information related to a user who requests cartoon content. For example, the cartoon content storing apparatus 300 may provide cartoon content including movement to a user who requested cartoon content including movement, and provide cartoon content including only still cuts to a user who requested cartoon content including only still cuts. Accordingly, the cartoon content storing apparatus 300 may receive from the cartoon content displaying apparatus 200, or self-generate, information related to a user of the cartoon content displaying apparatus 200. Also, the cartoon content storing apparatus 300 may store information related to a user of the cartoon content displaying apparatus 200 in one or more accounts of the user. In this case, the cartoon content storing apparatus 300 may distinguishably store information related to users according to cartoon content displaying apparatuses 200 or according to the accounts of the users. For example, the cartoon content storing apparatus 300 may store first cartoon reading information related to the first cartoon content displaying apparatus 200a and second cartoon reading information related to the second cartoon content displaying apparatus 200b. As another example, the cartoon content storing apparatus 300 may store third cartoon reading information related to a first account and fourth cartoon reading information related to a second account. In other words, the cartoon content storing apparatus 300 may distinguish information related to users based on whether apparatuses displaying cartoon content are different or based on whether accounts requested to display cartoon content are different.

The cartoon content storing apparatus 300 may provide general search services and other various services for increasing user convenience, as well as a service related to cartoon content. In other words, in addition to the service related to cartoon content, the cartoon content storing apparatus 300 may provide various services, such as search, emails, blogs, social network services (SNSs), news, and shopping information. Alternatively, the cartoon content storing apparatus 300 may be connected to a server providing a portal service, such as search, email, news, and shopping, and it may provide a webpage provided by the portal service to the cartoon content displaying apparatus 200 requesting the portal service for information. Here, the cartoon content storing apparatus 300 and the server providing a portal service may be separate apparatuses that are physically separated or the same apparatus that is only conceptually separated.

At least two of the cartoon content editing apparatus 100, the cartoon content storing apparatus 300, and the cartoon content manufacturing apparatus may be the same apparatus. For example, when a cartoonist manufactures and edits cartoon content by using one apparatus, the cartoon content editing apparatus 100 and the cartoon content manufacturing apparatus may be the same apparatus. As another example, when an editor stores cartoon content received from a cartoonist and edits the stored cartoon content, the cartoon content editing apparatus 100 and the cartoon content storing apparatus 300 may be the same apparatus. As another example, when a cartoonist manufactures, stores, edits, and provides cartoon content, the cartoon content editing apparatus 100, the cartoon content storing apparatus 300, and the cartoon content manufacturing apparatus may be the same apparatus.

The communication network 400 may connect the cartoon content editing apparatus 100, the cartoon content displaying apparatus 200, and/or the cartoon content storing apparatus 300. In other words, the communication network 400 may be a communication network providing a connection path such that the cartoon content editing apparatus 100, the cartoon content displaying apparatus 200, and/or the cartoon content storing apparatus 300 transmit and receive cartoon content or data including the cartoon content. The communication network 400 may be a wired network, such as a local area network (LAN), a wide area network (WAN), a metropolitan area network (MAN), or an integrated service digital network (ISDN), or a wireless network, such as wireless LAN, a code division multiple access (CDMA), Bluetooth, or satellite communication, but exemplary embodiments are not limited thereto.

Figure 2:
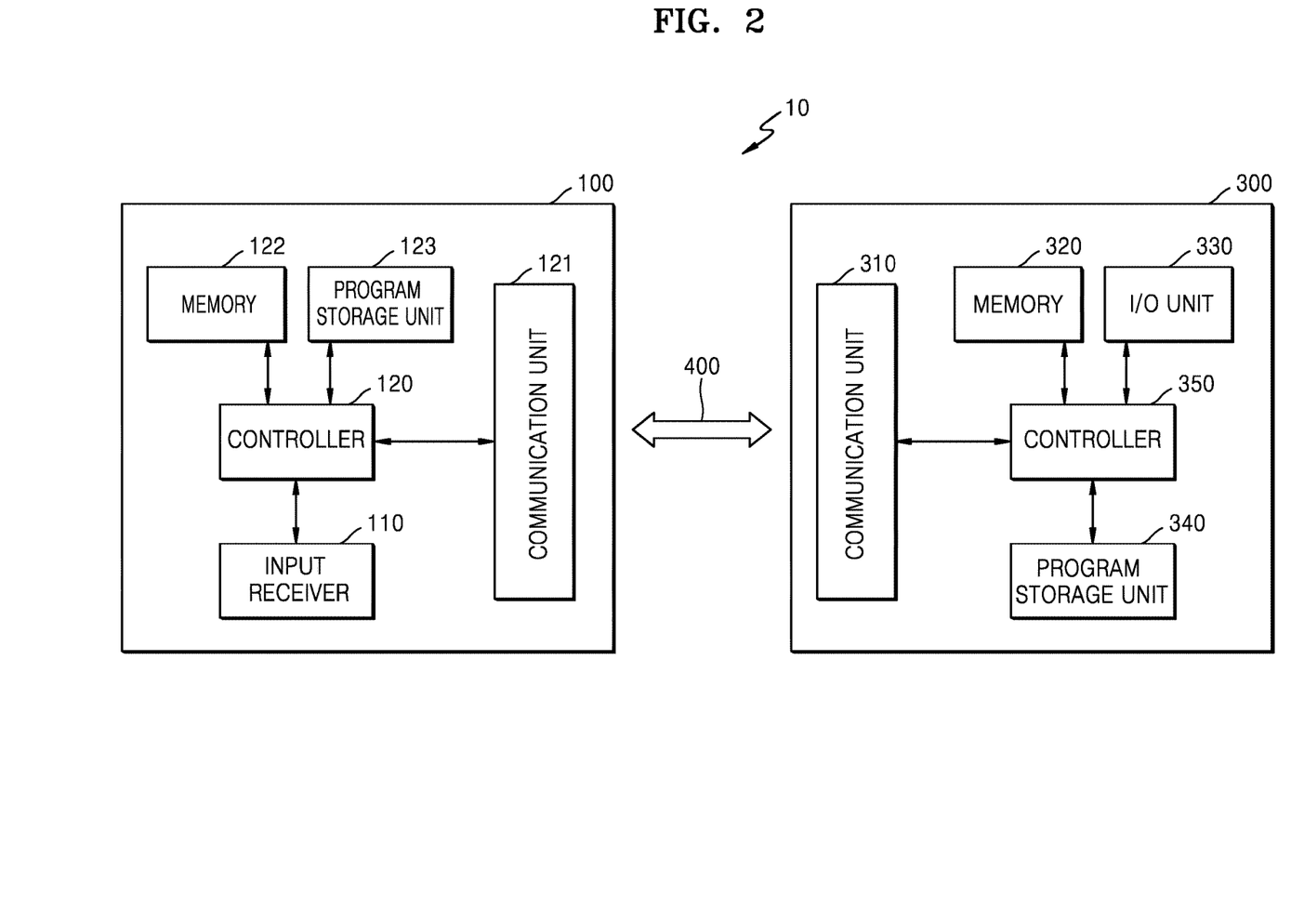
FIG. 2 is a block diagram schematically illustrating an internal configuration of a cartoon content providing system, according to an exemplary embodiment.

FIG. 2 is a block diagram schematically illustrating an internal configuration of the cartoon content providing system 10, according to an exemplary embodiment.

Referring to FIG. 2, the cartoon content editing apparatus 100 of the cartoon content providing apparatus 10 according to an exemplary embodiment may include an input receiver 110 and a controller 120. Also, the cartoon content editing apparatus 100 may further include a communication unit 121, a memory 122, and a program storage unit 123.

The input receiver 110 may be a unit receiving a command for controlling the cartoon content editing apparatus 100 from a user. For example, the input receiver 100 may include a keyboard, a keypad, a dome switch, a touch pad (a contact capacitance type, a pressure resistance film type, an infrared detecting type, a surface ultrasound conducting type, an integrated tension measuring type, or a piezo-effect type), a jog wheel, a jog switch, or a mouse, and may be an apparatus for performing a click input through a mouse of a user, an input through a keyboard of a user, or a voice input of a user, an apparatus receiving such inputs, or an apparatus detecting such inputs, but exemplary embodiments are not limited thereto.

The input receiver 110 may be a unit for analyzing a command received from a user through an internal or external input device, and generating a signal according to the command. In other words, when a user performs a certain input through a keyboard, a keypad, a dome switch, any type of touch pad, a jog wheel, a jog switch, or a mouse, the input receiver 110 may detect an electric or mechanical signal generated by the certain input, and determine whether the detected electric or mechanical signal corresponds to a pre-set operation. When it is determined that a signal received from a user corresponds to a pre-set operation, the input receiver 100 determines that a command indicating the pre-set operation has been received. For example, a user may select a certain motion cut and then click a certain user interface (UI) through the cartoon content editing apparatus 100, and the clicking of the certain UI denotes generating a still cut from the certain motion cut. In this case, the input receiver 110 generates a signal for generating the still cut from the certain motion cut, and transmits the generated signal to the controller 120. As such, the input receiver 110 receives a command to generate a still cut that is a still image from a motion cut including movement from among cuts included in cartoon content.

The controller 120 may generally control overall operations of the cartoon content editing apparatus 100. For example, the controller 120 may execute programs stored in the program storage unit 123 to control the input receiver 110 and overall components included the cartoon content editing apparatus 100.

The controller 120 may include any type of apparatus capable of processing data, such as a processor. Here, a processor may be a data processing apparatus embedded in hardware and includes a physically structured circuit to perform a function expressed in a command or a code included in a program. Examples of such a data processing apparatus embedded in hardware include a microprocessor, a central processing unit (CPU), a processor core, a multi-processor, an application-specific integrated circuit (ASIC), and a field programmable gate array (FPGA), but are not limited thereto.

The controller 120 may control a display unit to display a process of editing cartoon content. Here, the display unit displays information processed by the cartoon data editing apparatus 100. The display unit may display at least one of the cuts included in the cartoon content. The display unit may be a component included in the cartoon content editing apparatus 100, or may be disposed outside the cartoon content editing apparatus 100. When the cartoon content editing apparatus 100 includes the display unit, the controller 120 may generally control the display unit to display a process of editing cartoon content and the UIs used to edit the cartoon content. When the display unit is disposed outside the cartoon content editing apparatus 100, the controller 120 may transmit control signals for controlling the display unit to the display unit such that a process of editing cartoon content and the UIs used to edit the cartoon content are displayed on the display unit. Hereinafter, it is expressed that the controller 120 controls the display unit to display a certain image in both cases in which the display unit is included in or is disposed outside the cartoon content editing apparatus 100. The display unit may include at least one of an LCD, a TFT-LCD, an OLED, a flexible display, a 3D display, and an electrophoretic display, but exemplary embodiments are not limited thereto.

The controller 120 may generate a still cut including at least one of the scenes shown during movement of a motion cut. Examples of various operations performed by the controller 120 to edit cartoon content will be described below with reference to FIG. 5.

The communication unit 121 may perform wired/wireless communication with at least one of the cartoon content displaying apparatus 200 and the cartoon content storing apparatus 300. The communication unit 121 may be a Bluetooth communication unit, a Bluetooth low energy (BLE) communication unit, a near-field communication unit, a WLAN (Wi-Fi) communication unit, a Zigbee communication unit, an infrared data association (IrDA) communication unit, a Wi-Fi direct (WFD) communication unit, an ultra-wideband (UWB) communication unit, or an Ant+ communication unit, but exemplary embodiments are not limited thereto.

The communication unit 121 may transmit and receive a wired/wireless signal to and from at least one of the cartoon content displaying apparatus 200, the cartoon data storing apparatus 300, and a base station on the communication network 400. A wired/wireless signal may include cartoon content itself or any type of data including cartoon content. For example, the communication unit 121 may transmit and receive cartoon content including at least one motion cut or cartoon content including only still cuts to and from the cartoon content displaying apparatus 200 or the cartoon content storing apparatus 300. The communication unit 121 may be an apparatus including hardware and software required to transmit and receive cartoon content itself or various types of data including cartoon content to and from at least one of the cartoon content displaying apparatus 200, the cartoon content storing apparatus 300, the cartoon content manufacturing apparatus, and the base station through wired/wireless connection. The communication unit 121 may include the input receiver 110, or the input receiver 110 may include the communication unit 121.

The memory 122 may perform a function of temporarily or permanently storing data processed by the controller 120. Here, the memory 122 may include a magnetic storage medium or a flash storage medium, but exemplary embodiments are not limited thereto.

The program storage unit 123 may include control software for performing an operation of executing a program for editing cartoon content, an operation of maintaining, restoring, or updating a program for editing cartoon content, and an operation required to operate various components of the cartoon content editing apparatus 100.

The input receiver 110, the controller 120, and other components included in the cartoon content editing apparatus 100 may be physically separated physical apparatuses, or logically separated units in one physical apparatus. Also, the input receiver 110, the controller 120, and some of the other components included in the cartoon content editing apparatus 100 may be hardware or software realized in a form including the remaining components included in the cartoon content editing apparatus 100. Also, the input receiver 110, the controller 120, and the other components included in the cartoon content editing apparatus 100 may be a logical block classified in algorithms on a computer program executed by the cartoon content editing apparatus 100.

Referring to FIG. 2 again, the cartoon content storing apparatus 300 according to an exemplary embodiment may include a communication unit 310, a memory 320, an input/output (I/O) unit 303, a program storage unit 340, and a controller 350.

The communication unit 310 may be an apparatus including hardware and software required to transmit and receive cartoon content itself or various types of data including cartoon content to and from at least one of the cartoon content editing apparatus 100, the cartoon content displaying apparatus 200, the cartoon content manufacturing apparatus, and the base station through the communication network 400 via wired/wireless connection.

The memory 320 may temporarily or permanently store data processed by the controller 350. Here, the memory 320 may include a magnetic storage medium or a flash storage medium, but exemplary embodiments are not limited thereto.

The I/O unit 330 may include a display unit and an input unit. The display unit may be a unit for displaying an interface required to store, manage, maintain, transmit, or receive cartoon content. The display unit may include at least one of a LCD, a TFT-LCD, an OLED, a flexible display, a 3D display, and an electrophoretic display, but exemplary embodiments are not limited thereto. The input unit may be a unit for receiving commands for controlling the cartoon content storing apparatus 300 from a manager of the cartoon content storing apparatus 300. For example, the input unit may include a keyboard, a keypad, a dome switch, a touch pad (a contact capacitance type, a pressure resistance film type, an infrared detecting type, a surface ultrasound conducting type, an integrated tension measuring type, or a piezo-effect type), a jog wheel, a jog switch, or a mouse, and may be an apparatus for performing a click input through a mouse of a manager, an input through a keyboard of a manager, or a voice input of a manager, an apparatus receiving such inputs, or an apparatus detecting such inputs, but exemplary embodiments are not limited thereto.

The program storage unit 340 may include control software for performing an operation of transmitting and receiving cartoon content to and from the cartoon content manufacturing apparatus, the cartoon content editing apparatus 100, or the cartoon content displaying apparatus 200, an operation of storing or restoring cartoon content, and operations required to operate various components of the cartoon content storing apparatus 300.

The controller 350 may generally control overall operations of the cartoon content storing apparatus 300. For example, the controller 350 may execute programs stored in the program storage unit 340 to control, overall, the communication unit 310, the memory 320, the I/O unit 330, and other components included in the cartoon content storing apparatus 300. The controller 350 may include any type of apparatus capable of processing data, such as a processor. Examples of the controller 350 include a microprocessor, a CPU, a processor core, a multiprocessor, ASIC, and FPGA, but are not limited thereto.

Figure 3:
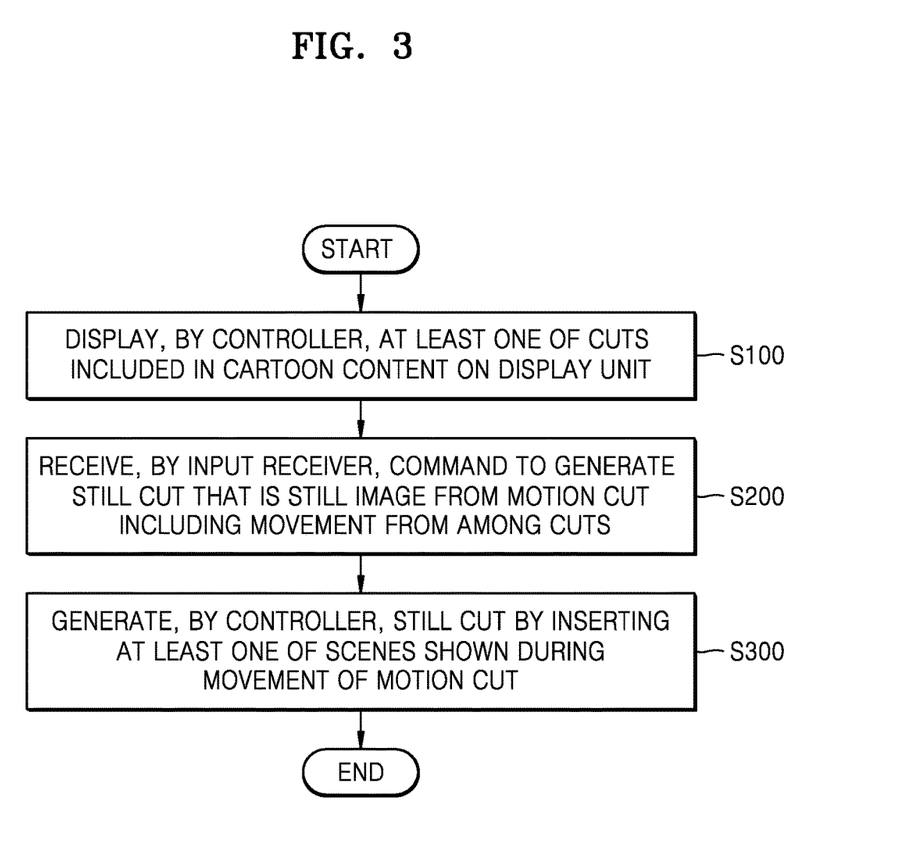
FIG. 3 is a flowchart of a cartoon content editing method according to an exemplary embodiment.

FIG. 3 is a flowchart of a cartoon content editing method according to an exemplary embodiment.

The cartoon content editing method of claim 3 includes operations that are performed in time-series by the cartoon content editing apparatus 100 of FIG. 2. Accordingly, details described above with reference to FIG. 2 should be considered as being applied to the cartoon content editing method of FIG. 3, even if omitted from FIG. 3.

Referring to FIG. 3, the cartoon content editing method according to an exemplary embodiment may include: displaying, by a controller, at least one of the cuts included in the cartoon content on a display unit (operation S100); receiving, by an input receiver, a command to generate a still cut that is a still image from a motion cut including movement from among the cuts (operation S200); and generating, by the controller, the still cut by inserting at least one of the scenes shown during the movement of the motion cut (operation S300).

In operation S100, the controller 120 may distinguishably display, on the display unit, the motion cut and the still cut that is a still image. For example, in operation S100, the controller 120 may control the display unit to display the motion cut and the still cut in distinguishable locations. As another example, in operation S100, the controller 120 may control the display unit to display a UI for adjusting a movement degree of the motion cut in a region adjacent to the motion cut. Here, in operation S100, the controller 120 may display, on the display unit, the still cut shown according to the movement degree of the motion cut.

In operation S200, the input receiver 110 may receive a command to generate a plurality of still cuts from the motion cut. At this time, in operation S300, the controller 120 may generate the plurality of still cuts each including at least one different scene from among the scenes shown during the movement of the motion cut. For example, when there are a plurality of scenes shown during the movement of the motion cut, in operation S300, the controller 120 may generate a first still cut including at least one scene from among the plurality of scenes, and a second still cut including at least one scene that is the same or different from the at least one scene included in the first still cut from among the plurality of scenes. Also, in operation S200, the controller 120 may display, on the display unit, at least one of the still cuts shown according to the movement degree of the motion cut as a still cut candidate group. For example, in operation S200, the controller 120 may select a still image in an initial state before the movement is generated in the motion cut, a still image in a final state after the movement in the motion cut is ended, and an image immediately before or after rapid movement is generated in the motion cut as the still cut candidate group of the motion cut, and display, on the display unit, the still cut candidate group.

In operation S300, the controller 120 may generate the still cut by inserting at least one of the scenes shown during the movement of the motion cut and a subsidiary image. For example, in operation S300, the controller 120 may generate the still cut including, in addition to the at least one of the scenes shown during the movement of the motion cut, an image obtained by applying at least one of various types of image processing effects to the scenes, at least one of auxiliary lines that are linear or curved, or various types of visual symbols. In other words, since the movement of the motion cut is unable to be directly shown by only using the still cut, various types of subsidiary images may be used in operation S300 to provide dynamics to the still cut.

The cartoon content editing method according to an exemplary embodiment may further include generating, by the controller 120, edited cartoon content including the generated still cut, after operation S300. The controller 120 may store the edited cartoon content in the memory 122 of the cartoon content editing apparatus 100. Also, the edited cartoon content may be transmitted, by the cartoon content editing apparatus 100, to the cartoon content displaying apparatus 200 or the cartoon content storing apparatus 300 through the communication network 400. Also, the cartoon content editing method according to an exemplary embodiment may further include, after operation S300, predicting, by the controller 120, an example of a form of displaying the edited cartoon content on a device of a user who views the edited cartoon content, and displaying, by the controller 120, the example on the display unit. Accordingly, an editor who edits the cartoon content may check an edited result image, and complete or re-edit the cartoon content based on the edited result image.

Figure 4:
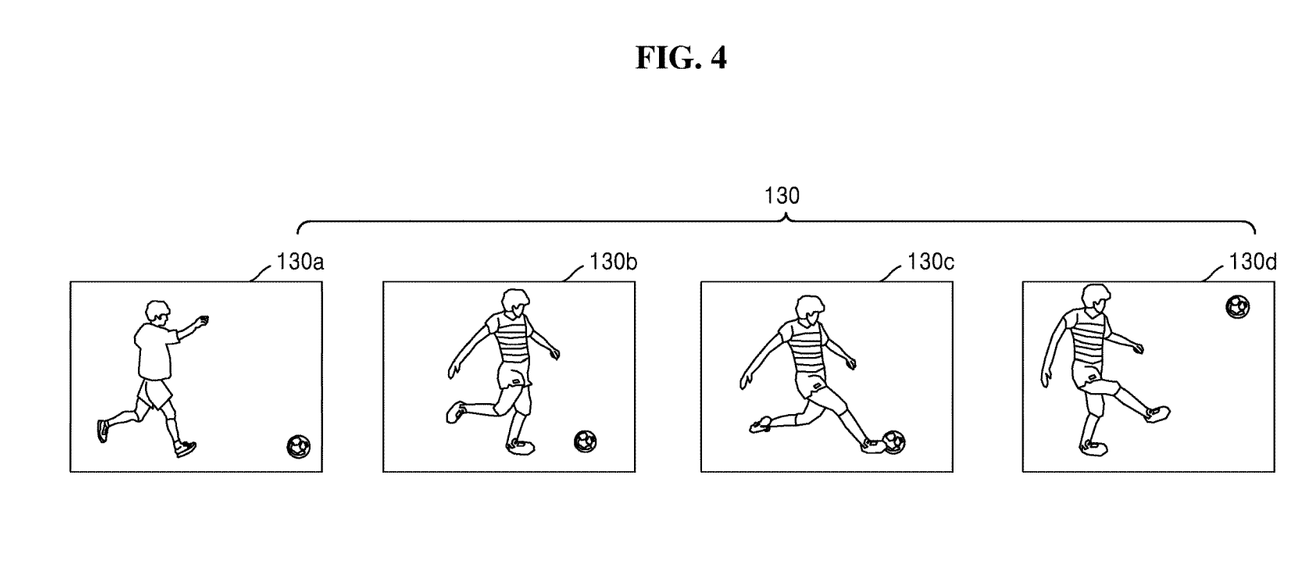
FIG. 4 schematically illustrates an example of a motion cut.

FIG. 4 schematically illustrates an example of a motion cut 130.

Referring to FIG. 4, a motion cut that is editable through the cartoon content editing apparatus 100 according to an exemplary embodiment may be a cut including movement.

A motion cut may include a change of a form of a visual symbol according to time. For example, there may be the motion cut 130 including movement in which a soccer player comes running and kicks a soccer ball. At this time, the motion cut 130 may be a cut including movement in which an image 130a of the soccer player comes running towards the soccer ball, an image 130b of the soccer player preparing to kick the soccer ball, an image 130c of the soccer player kicking the soccer ball, and an image 130d of the soccer ball flying away, where each of the images sequentially occur. In FIG. 4, images shown during the movement of the motion cut 130 are shown in four still images, i.e. the images 130a through 130d, but the images 130a through 130d are merely some of the movement of the motion cut 130 that may be edited by a cartoon content editing apparatus according to an exemplary embodiment. In other words, the images shown during the movement of the motion cut 130 may include a plurality of images showing the movement of the soccer player where he comes running and kicks the soccer ball between the images 130a through 130d, as well as the images 130a through 130d.

The motion cut 130 may include a plurality of layers. For example, the motion cut 130 may include first and second layers, wherein the first layer may be a drawing of the soccer player and the second layer may be a drawing of the soccer ball. The plurality of layers included in the motion cut 130 may include a layer that does not include movement. For example, the motion cut 130 may include, as well as the first and second layers, a third layer showing the sky as a background, and the third layer may be a still image without any change.

A frame per second of the movement of the motion cut 130 may be determined based on hardware performance of the cartoon content editing apparatus 100, hardware performance of the cartoon content displaying apparatus 200, a level set by software running the cartoon content editing apparatus 100, a level set by software running the cartoon content displaying apparatus 200, or a level set by an author manufacturing cartoon content. For example, when cartoon content is manufactured such that movement is expressed through 60 frames per second and the cartoon content displaying apparatus 200 displaying the cartoon content can only express 30 frames per second, the movement of the motion cut included in the cartoon content may be expressed through 30 frames per second.

Figure 5:
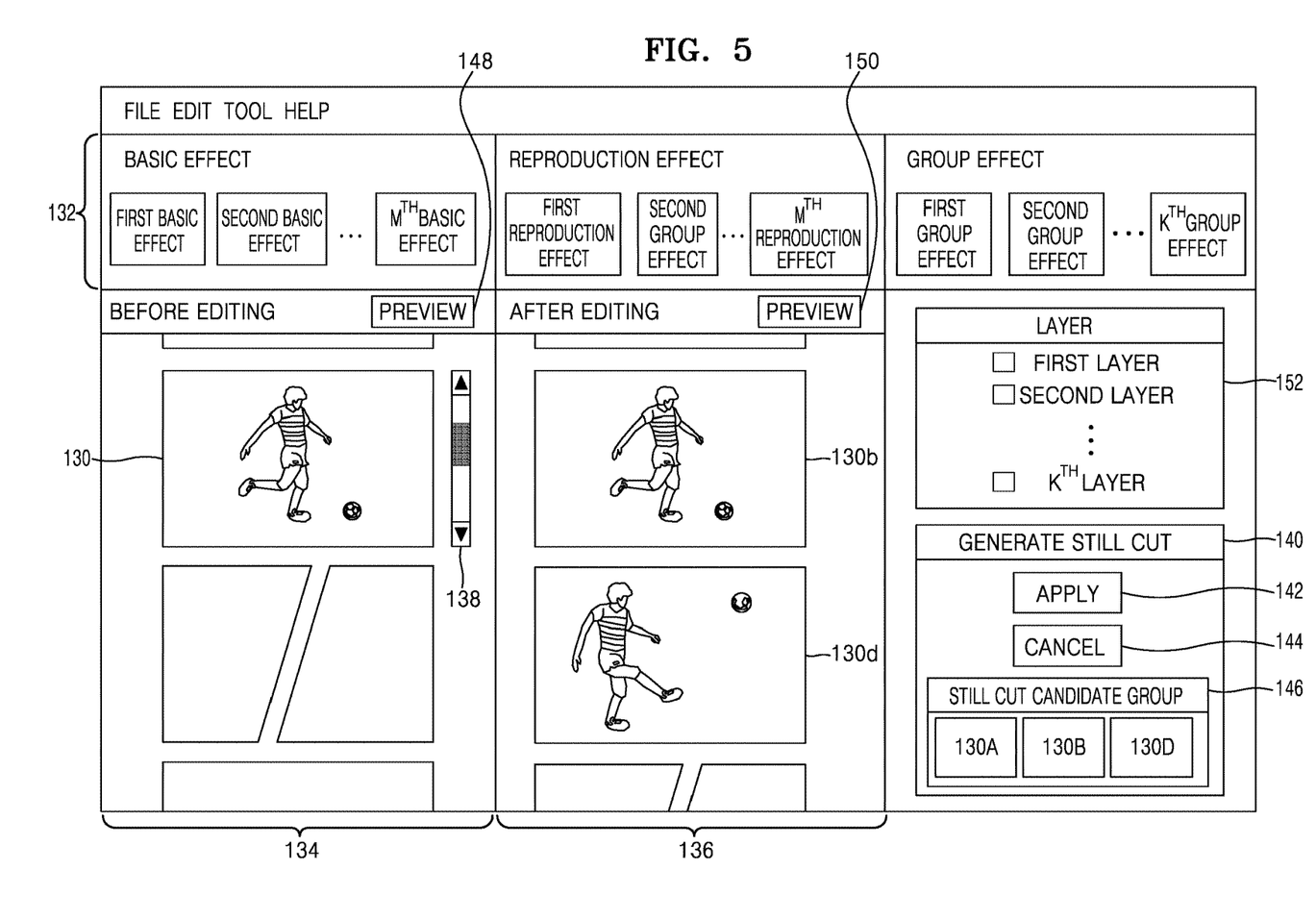
FIG. 5 is a diagram for describing an example of editing cartoon data by using a cartoon content editing apparatus, according to an exemplary embodiment.

FIG. 5 is a diagram for describing an example of editing cartoon data by using the cartoon content editing apparatus 100, according to an exemplary embodiment.

Referring to FIG. 5, in the cartoon content editing apparatus 100 according to an exemplary embodiment, the controller 120 may control the display unit to display a process of editing cartoon content. A method of visually displaying, by the controller 120, the process of editing the cartoon content on the display unit may vary. For example, the process of the cartoon content editing apparatus 100 editing the cartoon content may be visually displayed, by the controller 120, on the display unit by classifying various UIs indicating essential or subsidiary functions required to edit the cartoon content, in the form of windows as shown in FIG. 5.

The controller 120 may generate edited cartoon content by applying various types of effects on the cartoon content. For example, the controller 120 may control the display unit to display UIs 132 for applying various effects to the cartoon content. The UIs 132 for applying various effects to the cartoon content may include at least one of UIs for applying basic effects, such as changing a color, changing brightness, or inserting or removing a certain visual symbol, UIs for applying reproduction effects, such as causing the disappearance, causing the appearance, or the blinking of a certain visual symbol, or moving of a straight line or a curve, and UIs for applying group effects to a plurality of visual symbols at once, and may further include UIs for applying various types of image processing effects of audio processing effects.

The controller 120 may control the display unit to distinguishably display a motion cut and a still cut that is a still image. For example, the controller 120 may control the display unit to display a UI 134 showing the cartoon content before editing and a UI 136 showing the edited cartoon content after editing the cartoon content. At this time, the controller 120 may show scenes of cuts of the cartoon content including the motion cut through the UI 134, and show scenes of cuts of the edited cartoon content including the still cut generated from the motion cut through the UI 136. Accordingly, the controller 120 may enable an editor of the cartoon content to edit the cartoon content while comparing the cartoon content before editing and the edited cartoon content.

The controller 120 may control the display unit to display at least one of the still cuts shown according to a movement degree of the motion cut. For example, the controller 120 may control the display unit to display, on the U 1134, at least one of the images shown according to the movement degree of the motion cut 130, for example, the images 130a through 130d. Also, at this time, the controller 120 may control the display unit to display a UI 138 for adjusting the movement degree of the motion cut. For example, the controller 120 may control the display unit to display a UI in the form of a scroll bar inside the motion cut 130 or at a location corresponding to the motion cut 130. Here, the UI in the form of a scroll bar may be the UI 138 for adjusting the movement degree of the motion cut 130. In other words, when the scroll bar of the UI is at the top or at the bottom, a still image at an initial state before movement is generated in the motion cut 130 or a still image in a final state after the movement of the motion cut is completed may be displayed at a location where the motion cut 130 is displayed. The UI 138 for adjusting the movement degree of the motion cut is in the form of a scroll bar in FIG. 5, but exemplary embodiments are not limited thereto. In other words, any type of UI for adjusting the movement of the motion cut through a numerical value, a location, or a color, may be used as the UI 138.

Meanwhile, the input receiver 110 may receive a command to generate a plurality of still cuts from a motion cut from an editor, and accordingly, the controller 120 may generate the plurality of still cuts each including at least one different scene from among scenes shown during the movement of the motion cut. For example, the input receiver 110 may receive, from the editor, a command to generate a plurality of still cuts from the motion cut 130. At this time, the controller 120 may generate images shown according to the movement degree of the motion cut 130, i.e., first and second still cuts corresponding to the motion cut 130, wherein the first still cut may be the image 130b and the second still cut may be the image 130d. Images included in the first and second still cuts may be personally selected by the editor. The controller 120 may control the display unit to display the first and second still cuts inside the UI 136 showing the edited cartoon content. In reality, it is difficult to express information generated according to movement of a motion cut in one still cut. In this case, a plurality of still cuts may be generated from one motion cut. The controller 120 according to an exemplary embodiment may generate a plurality of still cuts each including at least one different scene from among scenes shown during movement of a motion cut as described above, and may provide, to an editor, an opportunity to sufficiently express information generated according to the movement of the motion cut through the plurality of still cuts.

The controller 120 may control the display unit to display a UI for facilitating a process of generating a still cut from a motion cut. For example, the controller 120 may control the display unit to display a UI 140 including functions related to generating of a still cut. Here, the UI 140 may include a UI 142 for generating edited cartoon content by applying current edit details, and a UI 144 for canceling the current edit details. When a command of selecting the UI 142 is received from the editor through the input receiver 110, the controller 120 generates edited cartoon content to which edit details shown on the UI 136 are applied. When a command of selecting the UI 144 is received from the editor through the input receiver 110, the controller 120 cancels the current edit details.

The controller 120 may select at least one of the still cuts shown according to the movement degree of the motion cut as a part of a still cut candidate group. Also, the controller 120 may control the display unit to display the still cut candidate group. For example, the controller 120 may control the display unit to display a UI 146 showing the still cut candidate group inside the UI 140. Here, the still cut candidate group may include various images obtained from the motion cut, such as a still image in an initial state before the movement is generated in the motion cut, a still image in a final state after the movement of the motion cut is completed, and an image immediately before or after rapid movement occurs in the motion cut. In other words, images that may represent the movement of the motion cut may be selected as the still cut candidate group. Also, when a command of selecting one of images included in the still cut candidate group is received from the editor, the controller 120 controls the display unit to display the UI 136 displaying an image corresponding to the command. Accordingly, the controller 120 may provide, to the editor, options for easily generating a still cut.

The controller 120 may control the display unit to display an example of the form of displaying cartoon content on a device of a user viewing cartoon content before editing. Also, the controller 120 may control the display unit to display an example of the form of edited cartoon content on a device of a user viewing the edited cartoon content including a generated still cut. For example, the controller 120 may control the display unit to display a UI 148 for pre-viewing the form of the cartoon content before editing, and a UI 150 for pre-viewing the form of the edited cartoon content. When an input of the editor selecting the UI 148 is received, the controller 120 controls the display unit to display the example of the form of the cartoon content to be displayed on the device of the user viewing the cartoon content before editing. Also, when an input of the editor selecting the UI 150 is received, the controller 120 controls the display unit to display the example of the form of the edited cartoon content including the generated still cut to be displayed on the device of the user viewing the edited cartoon content. Accordingly, the controller 120 provides, to the editor, an opportunity to check how cartoon content after editing is to be displayed.

The controller 120 may control the display unit to display a UI 152 showing the layers of each cut. The controller 120 may generate the edited cartoon content including the generated still cut. The controller 120 may store the edited cartoon content in the memory 122 inside the cartoon content editing apparatus 100 or transmit the edited cartoon content to the cartoon content displaying apparatus 200 or the cartoon content storing apparatus 300 through the communication network 400.

Figure 6A:
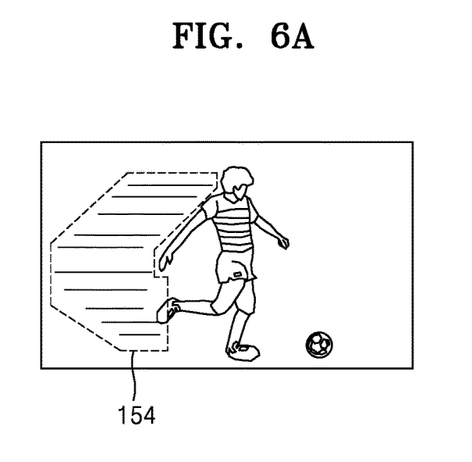
FIGS. 6A and 6B illustrate examples of still cuts generated by a cartoon content editing apparatus, according to an exemplary embodiment.
Figure 6B:
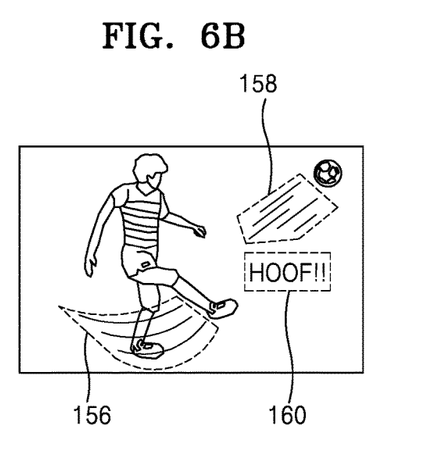

FIGS. 6A and 6B illustrate examples of still cuts generated by the cartoon content editing apparatus 100, according to an exemplary embodiment.

Referring to FIGS. 6A and 6B, in the cartoon content editing apparatus 100 according to an exemplary embodiment, the controller 120 may generate a still cut including at least one of the scenes shown during movement of a motion cut and a subsidiary image. For example, the controller 120 may generate still cuts corresponding to the motion cut 130 as shown in FIGS. 6A and 6B. Here, the controller 120 may add one or more auxiliary lines 154 behind the soccer player to add the effect to the still cut that the soccer player is running. Similarly, the controller 120 may add one or more auxiliary lines 156 at the legs of the soccer player, add one or more auxiliary lines 158 in the direction opposite of the direction the soccer ball is flying, and/or add auxiliary text 160 indicating a sound effect that may be generated when the soccer player kicks the soccer ball, thereby adding an effect to the still cut that the soccer ball is flying as the soccer player kicks the soccer ball. Accordingly, the controller 120 may provide, to an editor, an opportunity to include as much information included in the motion cut to the still cuts.

By using the cartoon content editing apparatus 100 according to an exemplary embodiment, cartoon content including motion cuts including movement may be edited to generate edited cartoon content including only still cuts including still images. Also, the cartoon content editing apparatus 100 according to an exemplary embodiment enables an editor to generate a still cut by using various images shown according to a movement degree and subsidiary images, thereby providing, to the editor, an opportunity to generate a still cut including all information included in a motion cut. Accordingly, the cartoon content displaying apparatus 200 that is unable to display movement of cartoon content may provide information related to the cartoon content, which is intended by a cartoonist.

According to one or more exemplary embodiments, a cartoon content editing method and a cartoon content editing apparatus, which edit cartoon content including movement to generate cartoon content including only still cuts may be provided.

Also, according to one or more exemplary embodiments, a cartoon content editing method and a cartoon content editing apparatus, which generate cartoon content including only still cuts including still images by editing cartoon content including motion cuts including movement, may be provided.

The one or more of the above exemplary embodiments may be embodied as a computer program that can be executed in a computer using various components. The computer program may be recorded on a non-transitory computer-readable recording medium. Examples of the non-transitory computer-readable recording medium may include a magnetic recording medium (a hard disc, a floppy disc, a magnetic tape, etc.), an optical recording medium (a CD-ROM, a DVD, etc.), a magneto-optical medium (e.g., a floptical disk), and a hardware device (e.g., a ROM, a RAM, a flash memory, etc.) specially designed to store and execute program commands. Furthermore, the non-transitory computer-readable recording medium may be a formless medium that can be transmitted and distributed in a network, e.g., software or an application.

The computer program may be designed and configured specially for the inventive concept or would be obvious to those of ordinary skill in the field of computer software. Examples of the computer program include not only machine language codes prepared by a compiler but also high-level language codes executable by a computer using an interpreter.

The use of the terms 'a', 'an', and 'the' and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein.

Finally, the operations of all methods described herein can be performed in an appropriate order unless otherwise indicated herein or otherwise clearly contradicted by context. The inventive concept is not limited by the order in which the operations are described herein. The use of any and all examples, or exemplary language (e.g., "such as") provided herein, is intended merely to clearly describe the inventive concept and does not pose a limitation on the scope of the inventive concept unless otherwise claimed. Numerous modifications and adaptations will be readily apparent to those skilled in this art without departing from the spirit and scope of the inventive concept.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A cartoon content editing method for editing cartoon content, the method comprising:
   displaying on a display unit, as an original presentation, original cartoon content comprised of a plurality of cuts, wherein:
      the plurality of cuts includes both at least one motion cut and original still cuts;
      the at least one motion cut represents at least one set of moving images respectively; and
      the original still cuts represent respective still images;
   receiving, by an input unit, a command to edit the original cartoon content;
   generating, by a controller, in response to the received command, at least two candidate still cuts from a selected one of the displayed at least one motion cut;
   inserting, into a user interface, the generated at least two candidate still cuts;
   creating a still cut candidate group on the user interface, wherein:
      the still cut candidate group includes the at least two candidate still cuts generated from the selected displayed motion cut; and
      at least two of the at least two candidate still cuts of the candidate groups are generated from a same one of the motion cuts;
   selecting, by the user of the user interface, at least one still cut from the still cut candidate group;
   generating and displaying on the display unit, an edited cartoon content presentation comprised only of still cuts, including the original still cuts and the selected at least one still cut from the still cut candidate group; and
   transmitting the still cuts of the edited cartoon content presentation.

2. The cartoon content editing method of claim 1, wherein the displaying comprises displaying, by the controller, the at least one motion cut and the original still cuts on the display unit to be distinguished from each other.

3. The cartoon content editing method of claim 1, wherein the user interface is configured and arranged for adjusting a movement degree of the selected motion cut on the display unit.

4. The cartoon content editing method of claim 1, wherein the generating of the edited cartoon content presentation comprises generating, by the controller, the selected at least one still cut by inserting, into the user interface, at least one scene shown during movement of the selected motion cut, and a subsidiary image.

5. The cartoon content editing method of claim 4, wherein the subsidiary image comprises at least one of:
   an image obtained by applying an image processing effect onto one of the scenes shown during the movement of the selected motion cut, an auxiliary line that is linear or curved,
a visual symbol automatically generated by the controller, and
a visual symbol received from a user.

6. The cartoon content editing method of claim 1, further comprising, after the generating of the edited cartoon content presentation, displaying, by the controller, an example of a form of displaying the edited cartoon content presentation on a device of a user viewing the edited cartoon content presentation comprising the selected at least one still cut, on the display unit.

7. A non-transitory computer-readable recording medium having recorded thereon a program, which when executed by a computer, performs the method of claim 1.

8. The cartoon content editing method of claim 1,
wherein the receiving comprises receiving, by the input unit, a command to generate the still cut candidate group comprising a plurality of candidate still cuts each comprising at least one different scene from among the scenes shown during the movement of the selected motion cut from the selected motion cut, wherein the still cut candidate group includes at least one of a candidate still image in an initial state before the movement of the selected motion cut, a candidate still image in a final state after the movement of the motion cut, and a still image immediately before or immediately after rapid movement of the selected motion cut, wherein the number of candidate still cuts in the still cut candidate group is less than the total number of still cuts in the selected motion cut, and
wherein the receiving further comprises displaying, by the controller, the plurality of candidate still cuts of the still cut candidate group on the display unit.

9. The cartoon content editing method of claim 1, wherein the edited cartoon content presentation includes a plurality of still cuts that have been generated from a single motion cut.

10. A cartoon content editing apparatus for editing cartoon content comprising:
a display unit configured to display, as an original presentation, original cartoon content comprised of a plurality of cuts, wherein:
the plurality of cuts includes both at least one motion cut and original still cuts;
the at least one motion cut represents at least one set of moving images respectively; and
the original still cuts represent respective still images;
an input unit configured to receive a command to edit the original cartoon content; and
a controller configured to generate, in response to the received command, at least two candidate still cuts from a selected one of the displayed at least one motion cut, and to create a still cut candidate group including the at least two candidate still cuts generated from the selected motion cut, wherein at least two of the at least two candidate still cuts of the candidate groups are generated from a same one of the motion cuts,
wherein:
the input unit is configured to receive a selection from a user, and
the controller is configured to select, in response to the selection, at least one still cut from the still cut candidate group, and to generate an edited cartoon content presentation comprised only of still cuts, including the original still cuts and the selected at least one still cut from the still cut candidate group.

11. The cartoon content apparatus of claim 10, wherein the controller is configured and arranged to display the at least one motion cut and the original still cuts on the display unit to be distinguished from each other.

12. The cartoon content editing apparatus of claim 10, wherein the controller is configured and arranged to display a user interface for adjusting a movement degree of the selected motion cut on the display unit.

13. The cartoon content editing apparatus of claim 10, wherein the controller is configured and arranged for generating the selected at least one still cut by inserting, into the user interface, at least one scene shown during movement of the selected motion cut, and a subsidiary image.

14. The cartoon content editing apparatus of claim 13, wherein the subsidiary image comprises at least one of:
an image obtained by applying an image processing effect onto one of the scenes shown during the movement of the selected motion cut,
an auxiliary line that is linear or curved,
a visual symbol automatically generated by the controller, and
a visual symbol received from a user.

15. The cartoon content editing apparatus of claim 10, wherein the controller is configured and arranged to display an example of a form of displaying the edited cartoon content presentation on a device of a user viewing the edited cartoon content presentation comprising the selected at least one still cut, on the display unit.

16. The cartoon content editing apparatus of claim 10,
wherein the input unit is configured and arranged to receive a command to generate the still cut candidate group comprising a plurality of candidate still cuts each comprising at least one different scene from among the scenes shown during the movement of the selected motion cut from the selected motion cut, wherein the still cut candidate group includes at least one of a candidate still image in an initial state before the movement of the selected motion cut, a candidate still image in a final state after the movement of the selected motion cut, and a candidate still image immediately before or immediately after rapid movement of the selected motion cut, wherein the number of candidate still cuts in the still cut candidate group is less than the total number of still cuts in the selected motion cut, and
wherein the controller is configured and arranged to display the plurality of still cuts of the still cut candidate group on the display unit.

17. The cartoon content editing apparatus of claim 10, wherein the edited cartoon content presentation includes a plurality of still cuts that have been generated from a single motion cut.

* * * * *